(12) United States Patent
Porter et al.

(10) Patent No.: US 12,223,157 B2
(45) Date of Patent: Feb. 11, 2025

(54) INTERACTIVE DISPLAY WITH WORKFLOW MANAGEMENT SYSTEM

(71) Applicant: Palantir Technologies Inc., Denver, CO (US)

(72) Inventors: Eric Porter, Pepper Pike, OH (US); Paige Pauli, Seattle, WA (US); John Wiseheart, London (GB); Aditya Shashi, Seattle, WA (US); Benjamin Lee, Menlo Park, CA (US); Maciej Foks, London (GB); Jakob Frick, London (GB); Joshua Chomicki, Sunnyvale, CA (US); Bianca Rahill-Marier, London (GB)

(73) Assignee: Palantir Technologies Inc., Denver, CO (US)

( * ) Notice: Subject to any disclaimer, the term of this patent is extended or adjusted under 35 U.S.C. 154(b) by 463 days.

(21) Appl. No.: 17/443,940

(22) Filed: Jul. 28, 2021

(65) Prior Publication Data

US 2022/0011911 A1      Jan. 13, 2022

Related U.S. Application Data

(63) Continuation of application No. 16/416,589, filed on May 20, 2019, now Pat. No. 11,106,331.

(Continued)

(51) Int. Cl.
| | | |
|---|---|---|
| G06F 3/0482 | (2013.01) | |
| G06F 3/0484 | (2022.01) | |
| G06F 9/48 | (2006.01) | |
| G06F 21/31 | (2013.01) | |
| G06Q 10/06 | (2023.01) | |

(52) U.S. Cl.
CPC .......... *G06F 3/0482* (2013.01); *G06F 3/0484* (2013.01); *G06F 9/4881* (2013.01); *G06F 21/31* (2013.01); *G06Q 10/06* (2013.01); *G06F 2203/04803* (2013.01)

(58) Field of Classification Search
CPC .... G06F 3/0482; G06F 3/0484; G06F 9/4881; G06F 21/31; G06F 2203/04803; G06F 21/53; G06F 21/604; G06Q 10/06
See application file for complete search history.

(56) References Cited

U.S. PATENT DOCUMENTS

| | | | |
|---|---|---|---|
| 6,854,088 B2 * | 2/2005 | Massengale ... | G06Q 10/063118 705/7.17 |
| 8,160,911 B2 * | 4/2012 | Lau ................ | G06Q 10/063116 705/7.16 |

(Continued)

FOREIGN PATENT DOCUMENTS

EP      2846298 A1 *    3/2015    ........... G06F 3/0484

*Primary Examiner* — Yongjia Pan
(74) *Attorney, Agent, or Firm* — Knobbe, Martens, Olson & Bear, LLP

(57) ABSTRACT

A user interface for working through workflows can include a dual-region approach. The first display region can display a series of workflows that an assigned worker ("assignee") may have. Each of the workflows can have one or more tasks associated therewith. Each workflow and/or task can be associated with one or more triggers that initiate the assignment of that workflow and/or task. In response to selection of a workflow or task, the second display region can display information associated with the workflow or task.

20 Claims, 11 Drawing Sheets

Related U.S. Application Data

(60) Provisional application No. 62/676,886, filed on May 25, 2018.

(56) References Cited

U.S. PATENT DOCUMENTS

| | | | | |
|---|---|---|---|---|
| 8,296,170 | B2* | 10/2012 | O'Brien | G06Q 10/06 705/7.27 |
| 8,949,275 | B1* | 2/2015 | Aasuri-Maringanti | G06F 16/34 707/791 |
| 9,424,545 | B1* | 8/2016 | Lee | G06Q 10/063114 |
| 10,409,638 | B2* | 9/2019 | LaRock | G06F 9/5066 |
| 11,106,331 | B1 | 8/2021 | Porter et al. | |
| 2002/0007300 | A1* | 1/2002 | Slatter | H04L 67/567 705/7.13 |
| 2002/0143949 | A1* | 10/2002 | Rajarajan | H04L 41/0253 709/226 |
| 2002/0165723 | A1* | 11/2002 | Kroeger | G06Q 10/06 705/315 |
| 2004/0104939 | A1 | 6/2004 | Locke et al. | |
| 2005/0159990 | A1* | 7/2005 | Barrett | G06Q 10/06 705/7.22 |
| 2006/0069599 | A1 | 3/2006 | Hatoun et al. | |
| 2006/0168530 | A1* | 7/2006 | Muller | G06Q 10/10 715/751 |
| 2006/0200372 | A1* | 9/2006 | O'Cull | G06Q 10/06312 705/7.22 |
| 2007/0011678 | A1* | 1/2007 | Lee | G06Q 10/025 718/100 |
| 2007/0168861 | A1* | 7/2007 | Bell | G06F 3/0481 715/701 |
| 2007/0282657 | A1 | 12/2007 | Hupfer et al. | |
| 2008/0065460 | A1* | 3/2008 | Raynor | G06Q 10/063114 705/7.15 |
| 2008/0313536 | A1* | 12/2008 | Larsen | G06Q 10/06 715/273 |
| 2009/0055770 | A1* | 2/2009 | King | G06Q 10/10 715/810 |
| 2009/0164490 | A1* | 6/2009 | Wininger | G06Q 10/06 715/705 |
| 2009/0299811 | A1* | 12/2009 | Verfuerth | G06Q 10/06311 705/7.13 |
| 2011/0022662 | A1* | 1/2011 | Barber-Mingo | G06Q 10/109 706/47 |
| 2011/0071869 | A1* | 3/2011 | O'Brien | G06Q 10/103 705/7.12 |
| 2011/0264593 | A1* | 10/2011 | Gaisford | G06Q 10/103 715/810 |
| 2012/0060162 | A1 | 3/2012 | Hunt et al. | |
| 2012/0130907 | A1* | 5/2012 | Thompson | G06Q 10/103 705/301 |
| 2012/0151311 | A1* | 6/2012 | Mathai | G06Q 10/06 715/205 |
| 2014/0053096 | A1* | 2/2014 | Alonso Lago | G06F 3/0481 715/772 |
| 2015/0005009 | A1* | 1/2015 | Tomkins | H04W 4/02 455/456.3 |
| 2015/0127628 | A1* | 5/2015 | Rathod | G06Q 30/0251 707/710 |
| 2015/0309978 | A1 | 10/2015 | Howell et al. | |
| 2016/0063421 | A1 | 3/2016 | Singh et al. | |
| 2016/0140501 | A1* | 5/2016 | Figlin | G06Q 10/063114 705/7.15 |
| 2016/0277536 | A1* | 9/2016 | Barry | G06Q 10/10 |
| 2017/0061360 | A1* | 3/2017 | Rucker | G06Q 10/063114 |
| 2017/0329614 | A1* | 11/2017 | Schon | G06F 3/0481 |
| 2018/0114178 | A1* | 4/2018 | Asokan | G06Q 10/109 |
| 2019/0318291 | A1 | 10/2019 | Diriye et al. | |

* cited by examiner

Figure 3A:
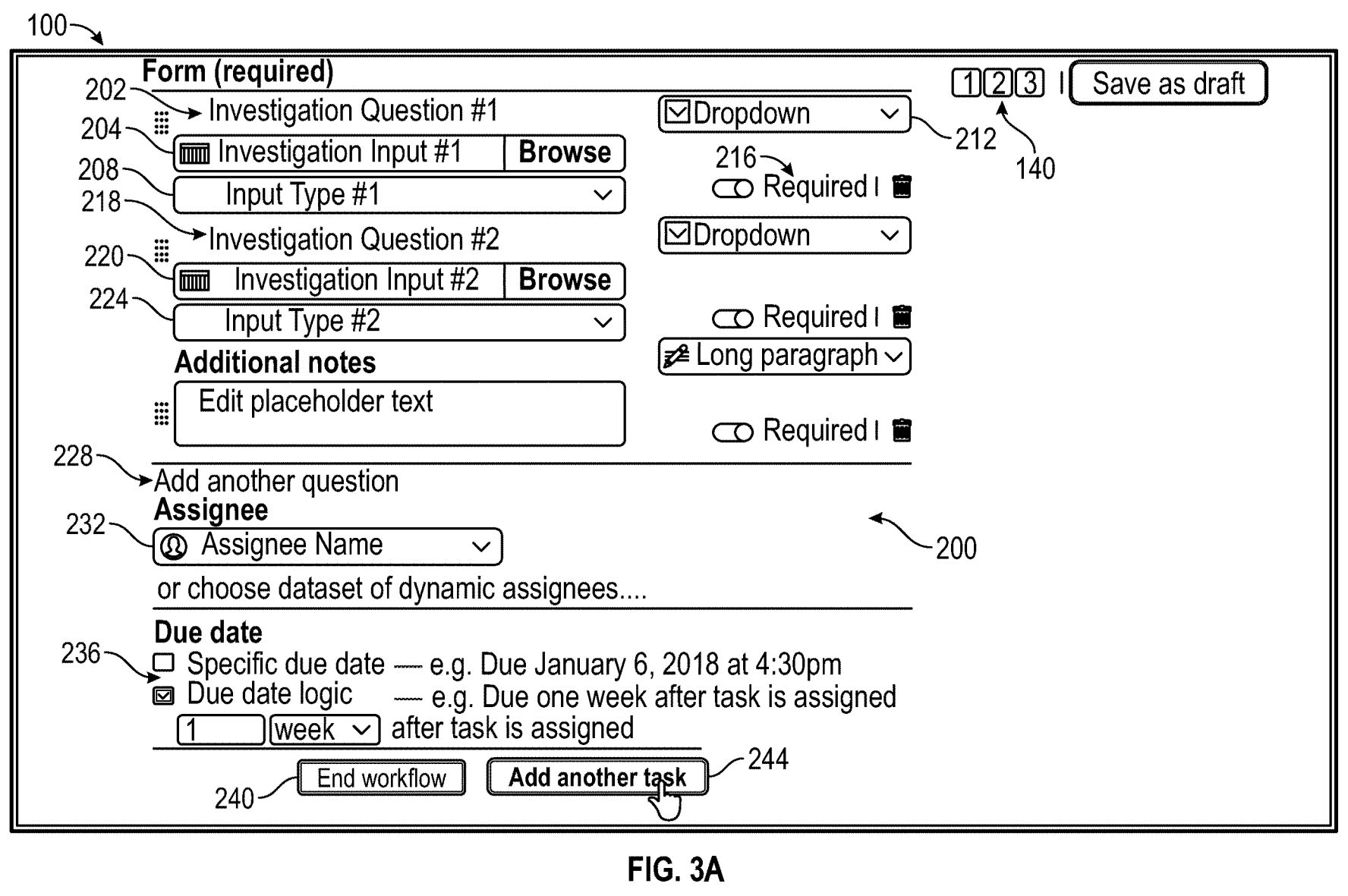

Form (required)

- Investigation Question #1
- Investigation Input #1 | Browse
- Input Type #1 ▽
  - ○ Required !
- Investigation Question #2
- Investigation Input #2 | Browse
- Input Type #2 ▽
  - ○ Required !
- Dropdown ▽
  - ○ Long paragraph ▽
  - ○ Required !

Additional notes

Edit placeholder text

Add another question

Assignee

@ Assignee Name ▽ or choose dataset of dynamic assignees....

Due date

☐ Specific due date —— e.g. Due January 6, 2018 at 4:30pm
☑ Due date logic —— e.g. Due one week after task is assigned
[1] [week ▽] after task is assigned

[End workflow]   [Add another task]

[1][2][3] | [Save as draft]

INTERACTIVE DISPLAY WITH WORKFLOW MANAGEMENT SYSTEM

INCORPORATION BY REFERENCE OF RELATED APPLICATIONS

This application is a continuation application of U.S. patent application Ser. No. 16/416,589, filed May 20, 2019, which claims the benefit under 35 U.S.C. § 119(e) of U.S. Provisional Patent Application Nos. 62/676,886, filed May 25, 2018, the entire contents of which is incorporated herein by reference and made a part of this specification.

BACKGROUND

Field

This disclosure relates generally to computing systems storing large datasets and user interfaces thereof.

Description of Related Art

Exploration, mining, and analysis of high-volume data sources and data warehouses can be a time and resource intensive process, both for the user and for the underlying computing systems which provide data analysis features. Managing use of this data in conjunction with many often disparate users can be an additional challenge. Such problems arise, for example, in managing workflows that include large volumes of data, which contribute to high consumption of computer memory, and processing of such large volumes of data can require extremely powerful computer processors and processing time. Users such as data analysts often face a seemingly insurmountable task of attempting to locate discrete pieces of information from data sources which can include or primarily consist of innocuous or noisy data which provides little probative value. Often, many iterations to explore such data are required, with each iteration having an associated cost in time and resources. These problems are compounded when trying to manage access permissions across many users.

SUMMARY

Example embodiments described herein have innovative features, no single one of which is indispensable or solely responsible for their desirable attributes. Without limiting the scope of the claims, some of the advantageous features will now be summarized.

In some embodiments, a computing system can include a computer readable storage medium having program instructions embodied therewith. The system may further include one or more processors that are configured to execute the program instructions to cause the computing system to perform one or more tasks. For example, the instructions may cause the system to generate data for rendering an interactive graphical user interface that includes a list of workflows and/or tasks. The instructions may cause the system, in response to a user selection of a task indicator, to update the data to display a resource link that is configured to point to resource material associated with a task. The instructions may cause the system, in response to a user selection of the resource link, to update the data to display the resource material in a first display region of the interactive graphical user interface and to simultaneously display one or more task elements associated with the task in a second display region of the interactive graphical user interface.

In some embodiments, a computing-implemented method can include generating data for rendering a task creation interface. The task creation interface can include a resource link selector that is associated with a resource link, which may be configured to point to resource material. The interface can include a task item selector that is associated with a task item for completion by an assignee. The interface can further include a task assignee selector. In response to a user selection of the resource link selector, the method can include associating the resource link with a task. The method may include associating, in response to a user selection of the task item selector, the task item with the task. The method can also include associating, in response to a user selection of the task assignee selector, the task to one or more assigned users.

BRIEF DESCRIPTION OF THE DRAWINGS

The following drawings and the associated descriptions are provided to illustrate embodiments of the present disclosure and do not limit the scope of the claims.

FIG. 3A shows another aspect of an example interactive graphical display interface, according to an embodiment of the present disclosure.

FIG. 7 shows yet another view of the interactive graphical display interface, according to an embodiment of the present disclosure.

Figure 1:
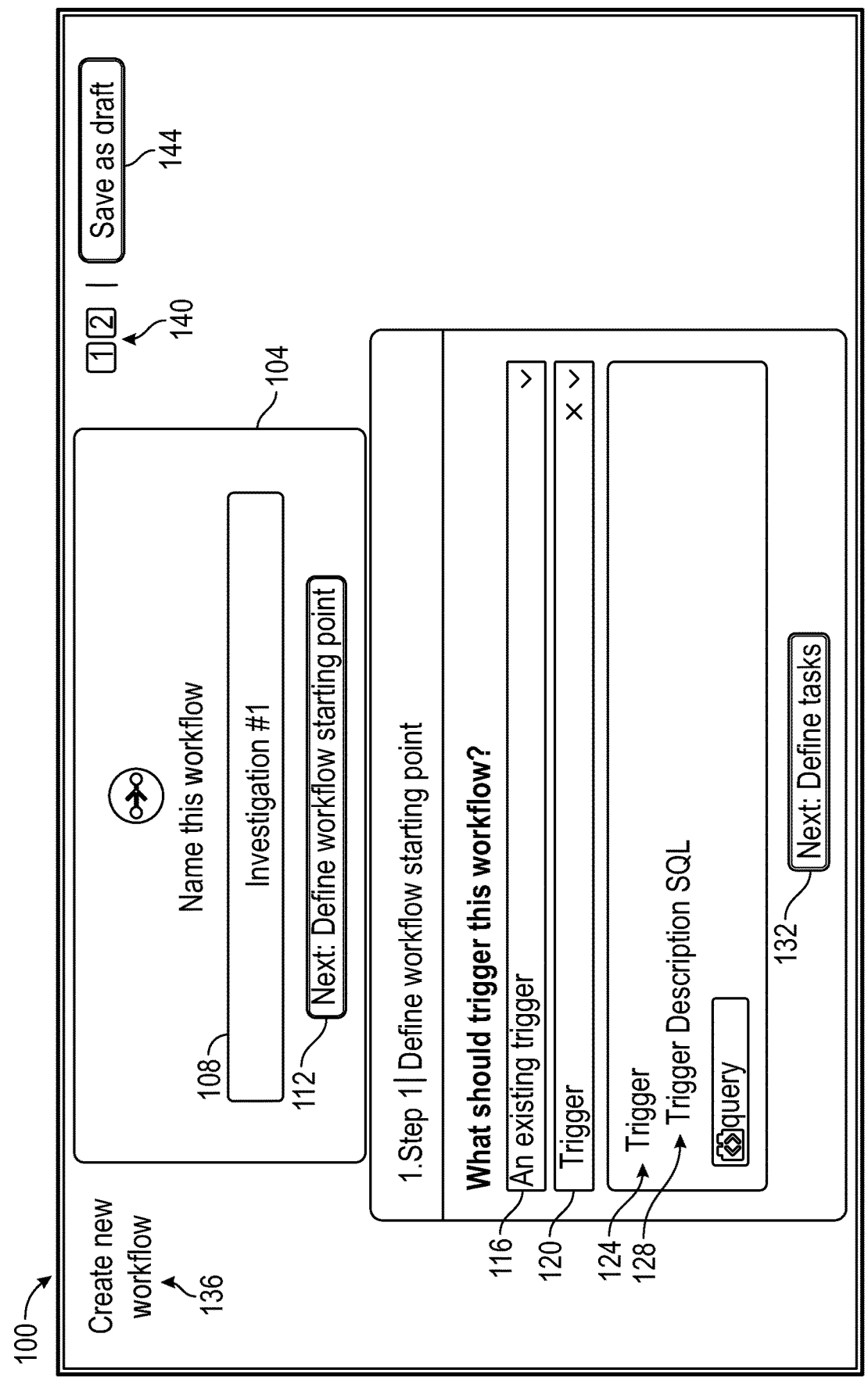
FIG. 1 shows an example interactive graphical display interface, according to an embodiment of the present disclosure.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. Unless explicitly indicated otherwise, terms as used herein will be understood to imply their customary and ordinary meaning.

Data analysts face a daunting challenge when tasked with exploring a large volume of data to identify discrete pieces of information and intelligence—a veritable needle-in-a-haystack problem. Moreover, managing this data in a user interface that can be used by many often disparate users is additionally challenging. Large scale, multicomputer datacenters host large quantities of data, and use of that data frequently involves large numbers of workers who are often remote from one another. The workers, and their use of the data, may not be effectively managed by non-technical managers, or systematically completed by one or more assigned workers. A user interface that allows one or more workers to move through a workflow would increase usability and intuitive operation if it can provide a helpful interface to review a current task at hand in the viewer while providing direct access to resources (e.g., simultaneously) via links that can help solve that task.

Even with the right data, however, the worker may not be equipped to navigate the seemingly endless amount of data in its multitudinous forms (e.g., graphs, charts, websites, internal links, etc.) to help uncover helpful information (e.g., trends) from the dataset and/or to complete assigned tasks in a workflow of one or more tasks. Other individuals, such as supervisors or managers, may not have the technical prowess to code or organize a user interface that functions within a workflow interface. User interfaces do not currently allow nontechnical users to properly benefit from workflow with associated resource link(s) and/or associated assignee(s) previously prepared by different users (e.g., managers) in a workflow template. Users can develop useful workflows that allow for the manipulation of data in novel ways. These workflows can be saved to a database and used by other users as needed. However, the workflows may require the completion of tasks by multiple users who may be remote from each other. Accordingly, a user's ability to benefit from the workflow may be limited without an interface that provides an intuitive UX and/or that provides the proper security permissions and/or access permissions to ensure that the correct users access the interface at the correct time or sequence.

A user interface for working through workflows can include a dual-region approach. The first display region can display a series of workflows that an assigned worker ("assignee") may have. Each of the workflows can have one or more tasks associated therewith. Each workflow and/or task can be associated with one or more triggers that initiate the assignment of that workflow and/or task. In response to selection of a workflow or task, the second display region can display information associated with the workflow or task. In the example of a workflow, multiple tasks may be presented to the user sequentially, and one at a time, and the user works through the workflow. The second display region can include, for a given task, a dynamic link to a resource (e.g., a website, a telephone number, an internal data analysis application, a file such as a report, etc.) along with other elements associated with that task. The link can be selected directly from within the workflow/task, and the associated resources to which the link points can be displayed in a portion of the user interface adjacent to the workflow/task. This can provide important data for the assignee to accomplish various elements of a given task. For example, various questions may need to be answered to complete the task. The answers can be supplied directly in the display adjacent to the task, accessible via the dynamic link. Simultaneous display of the link's contents with the other elements (e.g., questions) of the task may allow the user to more efficiently accomplish the task.

Using a workflow creation interface, a manager may be able to quickly and easily create a workflow by creating tasks with associated elements, any associated triggers, assignees, and any resource links. The workflow, with all associated elements, may be stored. The workflow can be initiated onto the assignee's user interface (see above) once the trigger condition has been met.

The systems and methods described herein provide highly dynamic and interactive user interfaces which enable the worker to quickly and efficiently fulfill or complete tasks that incorporate large volume data sources using. In particular, the worker may have access to the most salient information (e.g., a website link, an internal data link, a graph or chart, etc.) for completion of task in a workflow. In some cases, the worker has access only to the most salient information.

Each of these data visualization tools may include rich UI controls which are configured to respond to user interaction and input in a manner that allows the non-technical user to quickly and intuitively apply and/or use complex data workflows. For example, in a workflow interface, when a user selects (e.g., by clicking on, touching, speaking, etc.) or inputs a workflow, the system can prompt the user (e.g., a non-technical supervisor) to identify various features the workflow (e.g., name, item, item type, deadline, assignee, etc.) that may be applied to the workflow. Or, in another example, a user (e.g., a worker) can identify which tasks in the workflow should be completed, when they should be completed, by whom, and/or where the information is to complete those tasks.

To assist the worker user in navigating the otherwise overwhelming amount of data and organization required to complete various tasks, the data analysis system can provide a variety of path navigation user interface tools. For example, in one embodiment, a workflow and/or task overview may be generated and displayed (e.g., in various regions of the UI, as shown in the example user interfaces herein; or in any position). The UI control may indicate a summary of a task and/or filter details of the tasks displayed in the UI.

The data analysis system described herein provides a variety of additional features and benefits. In certain embodiments, the data analysis system and provided user interfaces may enable the data worker user to save workflows at any stage in the analysis path and/or export various aspects of the workflow (e.g., only those to whom access permissions have been granted). Example workflows may be saved as a template for use by future users.

Another benefit to the feature of saving workflows as templates (e.g., novel, modified) is that it may reduce the costs involved in constantly creating new workflows for use in a high-volume data source by reducing duplicated efforts of individuals. For example, the human and computer cost (both financial and physical resources in terms of memory, response time, processing speed, efficiency, power consumption, human effort, etc.) of maintenance, duplication, backups, and other redundancy measures for expression management can grow exponentially if copious amounts of noisy data are imported. Without such measures, intellectual creations related to the logical expressions may be lost. Thus, using the systems described herein, the specialized databases can be more fully explored to identify and extract valuable data.

In some embodiments, the data analysis system may be configured to function in response to trigger events. For example, steps may be added that commence or trigger processing of a data pipeline upon some external event. For example, a trigger step may comprise "every 2 hours", "every 3 days", "when new data is received", "when system load is low", "when user X has not accessed the system for 10 consecutive days", "when an email is received", etc. Steps may be added that perform an output or action. For example, an action step may comprise sending an email, a text message, playing a sound or displaying a notification. Some steps may comprise calls to external programs or resources ("API calls") to provide additional functionality. For example, some steps may invoke a stored procedure or other data processing routine on a database server and retrieve the results, or may cause a data pipeline workflow to initiate. Other steps may invoke rendering of a graph, chart or other visual representation of a data pipeline workflow.

End users (e.g., workers, supervisors) of data may not be familiar with programming concepts and techniques and thus may not be able to set up a data pipeline adequate to their needs. Additionally, different users may require or wish to use similar or identical steps in their data pipelines, or users may wish to set up a data pipeline conveniently reusing steps previously set up in a different data pipeline. Embodiments of the present disclosure provide steps that can be used by a user easily and without requiring the user to account for technical implementation. For example, synchronization, caching, concurrency and locking, API details, and hardware-specific optimizations are issues that may need to be accounted for when implementing complex and/or database-driven programs. Users who do not have the programming knowledge to implement such functionality may be precluded from leveraging computer technology to their data processing needs.

Advantageously, according to an embodiment, steps may be provided by the system that can be combined by the user without exposing the user to such technical details. When working on large datasets, end users may set up data pipelines without understanding the performance implications of the individual steps, and may thus inadvertently generate pipelines that deliver inadequate performance. Advantageously, according to an embodiment, the system may automatically estimate the performance of a sequence of steps (e.g., triggers) provided by a user to allow users to set up complex queries where necessary. The system may prevent system resources from being expended on defective or needlessly complex queries. Advantageously, embodiments of the present disclosure may use a scheduling engine that provides for centralized scheduling facility based on a variety of user-specified triggers. Triggers may be defined based on time, based on other types of events, or a combination of both. By using pre-defined trigger steps, the user may avoid having to implement inefficient programming constructs like poll loops.

Steps may be any sequence of computer operations. Some steps may include an entry point or beginning of execution, upon which the step is to be executed ("trigger step"). For example, some steps may provide that they be executed upon a database receiving new information. Other steps may output data, such as a step of printing or emailing information to a recipient. Additional functionality of some aspects of the trigger events and back-end computations, including data storage techniques, may be found in U.S. Provisional Application No. 62/610,073, titled "SYSTEM FOR DATA NORMALIZATION AND TRANSFORMATION AND INTERFACES FOR DATA PIPELINE CREATION," filed Dec. 22, 2017 which is hereby incorporated by reference herein in its entirety and for all purposes.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized interface for creating and scheduling data pipelines, and may reduce the complexity that a user setting up such data pipelines is exposed to.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, an implementation the system may comprise, or be implemented in, a "virtual computing environment". As used herein, the term "virtual computing environment" should be construed broadly to include, for example, computer readable program instructions executed by one or more processors (e.g., as described below in the example of FIG. 11) to implement one or more aspects of the modules and/or functionality described herein. Further, in this implementation, one or more modules of the system may be understood as comprising one or more rules engines of the virtual computing environment that, in response to inputs received by the virtual computing environment, execute rules and/or other program instructions to modify operation of the virtual computing environment. For example, a request received from the user computing device may be understood as modifying operation of the virtual computing environment to cause the request data aggregation module to gather data associated with the request, the request format generation module to generate third-party requests with the appropriate formats and information, and the API interaction module to transmit those requests to one or more APIs. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module and/or responses received and analyzed by the response aggregation module. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Additionally or alternatively, machine learning and/or artificial intelligence algorithms may be used by the systems described herein. Machine learning and/or artificial intelligence algorithms may iteratively learn from data without being explicitly programmed. Thus, a computing device configured to use such techniques to perform an action can learn how to perform the action without being explicitly programmed. Accordingly, such techniques can improve the functionality of the computing device itself because the machine learning techniques allow the computing device to learn, and thereby produce more accurate search results (e.g., when searching for workflows, tasks, resources, etc. by a user) without being explicitly programmed.

In some embodiments, the system may employ machine learning and/or artificial intelligence algorithms to improve functionality, efficiency of computer resources, and/or user experience. In such embodiments, machine learning and/or artificial intelligence functionality can improve the ability of the computer to identify one or more workflows or tasks for use by a user (or even a particular user) because the computer can automatically train a user model to identify likely candidate templates based on a user search without human intervention and may automatically improve the accuracy of the user model based on feedback data.

Another benefit of the embodiments described herein is the ability to nest various tasks within a workflow. The nested tasks may be assigned to different users. In this way, a user can focus on only the tasks to which it is assigned. In some embodiments, the workflow may include tasks that are not visible to those to whom the task is not assigned and/or to whom access permissions have not been granted. In this way, proper security measures may be used to prevent access to secret or sensitive data (e.g., personal data). For example, if the tasks include handling an employee's termination, only those workers (and/or the appropriate supervisors) who need to complete the various tasks will have access to those tasks without alerting others to the existence of the task and/or the task items.

Turning now to the figures, some example embodiments will now be disclosed. FIG. 1 shows an example interactive graphical display interface 100. The interactive graphical display interface 100 can include a workflow creation interface 104 for use in allowing a user (e.g., a manager/supervisor) to create a workflow. The workflow can be used to navigate a later user (e.g., one or more workers) in completing one or more tasks. A workflow may be at least one task for completion, usually by at least one user. A task may be at least one task item that requires a user input to be completed. The workflow creation interface 104 can include a workflow name selector 108 to allow a user to create a name for the workflow. In this case, the name is "Investigation #1," but many other examples could be chosen. The workflow creation interface 104 can further include a workflow name completion selector 112. The workflow name completion selector 112 can be selected to begin a selection of a workflow starting point, one or triggers to begin the workflow and/or various tasks, and other features. A trigger may include any event the completion of which causes (e.g., automatically or manually) or allows a second event to take place. The workflow creation interface 104 may further include a workflow trigger type selector 116. The workflow trigger type selector 116 can allow a user to choose which type of trigger(s) will be used. For example, the trigger may be pulled from an existing database of triggers and/or may be created from scratch. The workflow trigger selector 120 can allow the user to select which trigger will be used. Again, the trigger may be pulled from existing triggers (e.g., templates) and/or may be created from scratch. The workflow trigger selector 120 may include an interface for coding the trigger event. Discussion of triggers are disclosed herein and/or incorporated by reference herein.

The workflow creation interface 104 can include a workflow trigger indicator 124 that can show a user what the trigger is that has been selected. A workflow trigger description 128 may also be included, which can give the user and/or future users some information about how the trigger functions, how it is to be used, and/or any limitations associated with the trigger. When a user has completed the information in the workflow creation interface 104, the user may select a workflow trigger completion selector 132 to indicate that the user is ready for any next step(s). Various portions of the workflow creation interface 104 and/or any other features of the interactive graphical display interface 100 may be shown sequentially in time based on user responses. As shown, the workflow creation interface 104 includes various features shown simultaneously. However, one or more of these features may be included only after various selectors (e.g., the workflow name completion selector 112) have been selected. This may help streamline the user interface to improve the user experience in creating a workflow.

A workflow step number indicator 140 may be included to show a user where in the workflow creation process the user currently is. In some embodiments, the workflow step number indicator 140 also includes one or more step selectors to allow a user to seamlessly move to a different step in the process by selecting the step selectors. For example, the workflow step number indicator 140 may include clickable selectors that link directly to a different step in the process. Various other selectors, such as a new workflow selector 136 and/or a workflow progress save selector 144, can be included to allow users additional functionality, such as creating a new workflow and/or saving a current workflow to be updated at a later time.

Figure 2:
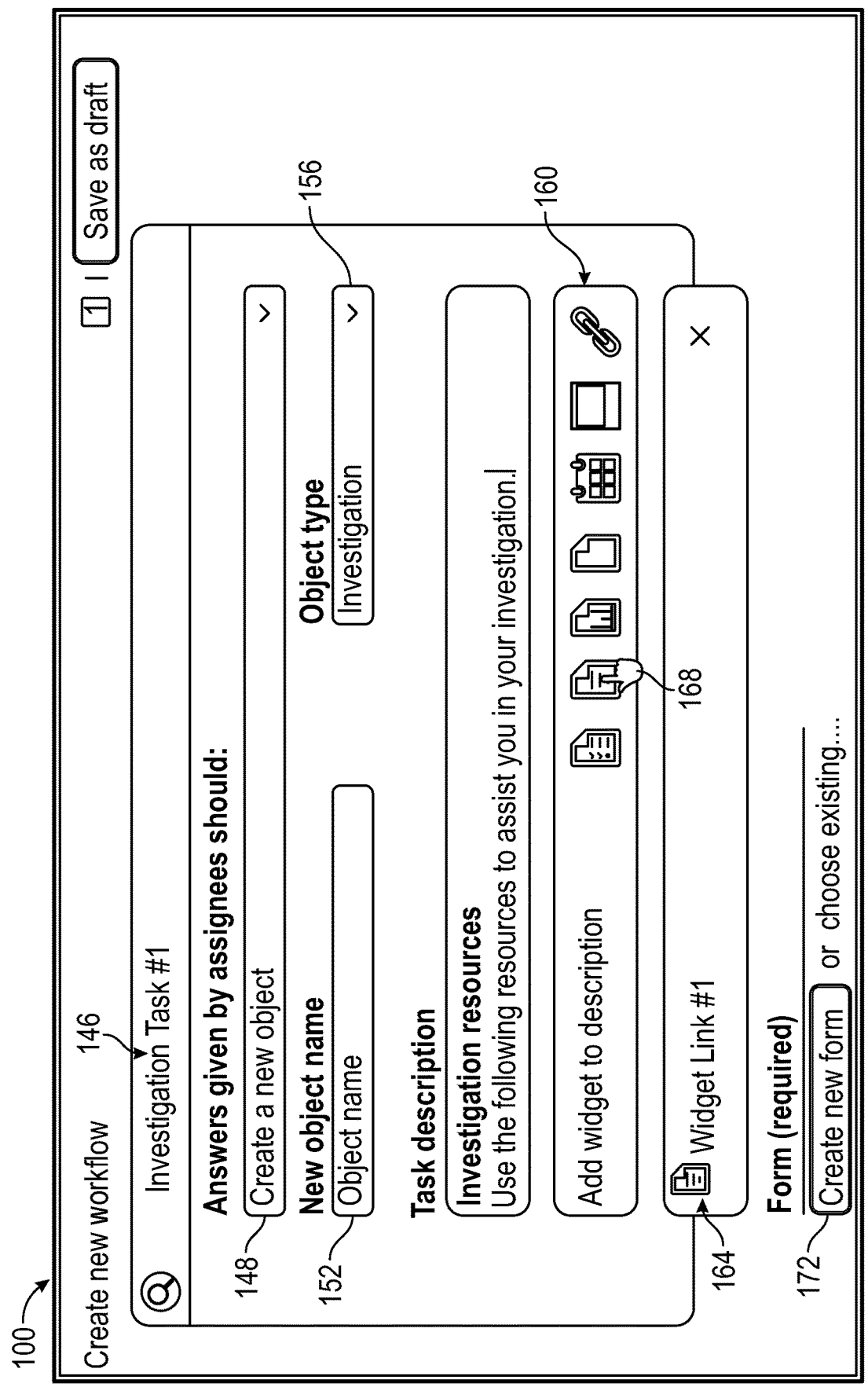
FIG. 2 shows another aspect of an example interactive graphical display interface, according to an embodiment of the present disclosure.

FIG. 2 shows another aspect of the interactive graphical display interface 100. As shown, the interactive graphical display interface 100 can include a task creation interface 146. The task creation interface 146 can allow a user to create one or more tasks. The number of tasks may depend on the number of tasks required in the workflow. The task creation interface 146 may include a task action type selector 148 to allow a user to specify how an assignee is to complete this task. As shown, the action type is to "create a new object." As used herein, the term "object" may sometimes mean "task." Thus, creating a new object may mean the creation of an additional task. Other action types are also possible. The task creation interface 146 can also include a task name selector 152 to identify the task for later. The name of the task may be included, for example, in the workflow overview/summary that another user (e.g., a worker) may see.

The user may be able to select a task type using a task type selector 156. As shown the task may be an "investigation," but other types are possible, such as a verification task, a report task, an audit task, a review task, and/or any other type of task a worker may be assigned. Advantageously, a user may be able to associate a resource to the task. The resource may be helpful to a worker in completing the task. The user may associate the resource by attaching a resource link to the task. A user position indicator 168 can be available on any of the aspects of the interactive graphical display interface 100 disclosed herein and/or may move in reference to any input device (e.g., the input device 716 of FIG. 11 below). As shown, the user position indicator 168 shows a user hovering over a resource selector menu 160. The resource selector menu 160 can allow a user to select the type of resource link to be associated with the task. A variety of resource link types can be used. For example, the link may be to a fillable form, an internal analysis, a visual (e.g., a chart, graph, plot, etc.), an internal template, an internal or external report, a dataset and/or spreadsheet, a document (e.g., PDF, DOC, etc.), a presentation, a shared file (e.g., from a document sharing site), a website, a video link, a calendar, a visual or audio file (e.g., photo, audio recording, video recording), etc. A corresponding link indicator may be selectable by a user. One or more links may be attached to a given task. As shown in FIG. 2, the user has selected a resource link 164 called "Widget Link #1." In some embodiments, additional links could be added.

Figure 4:
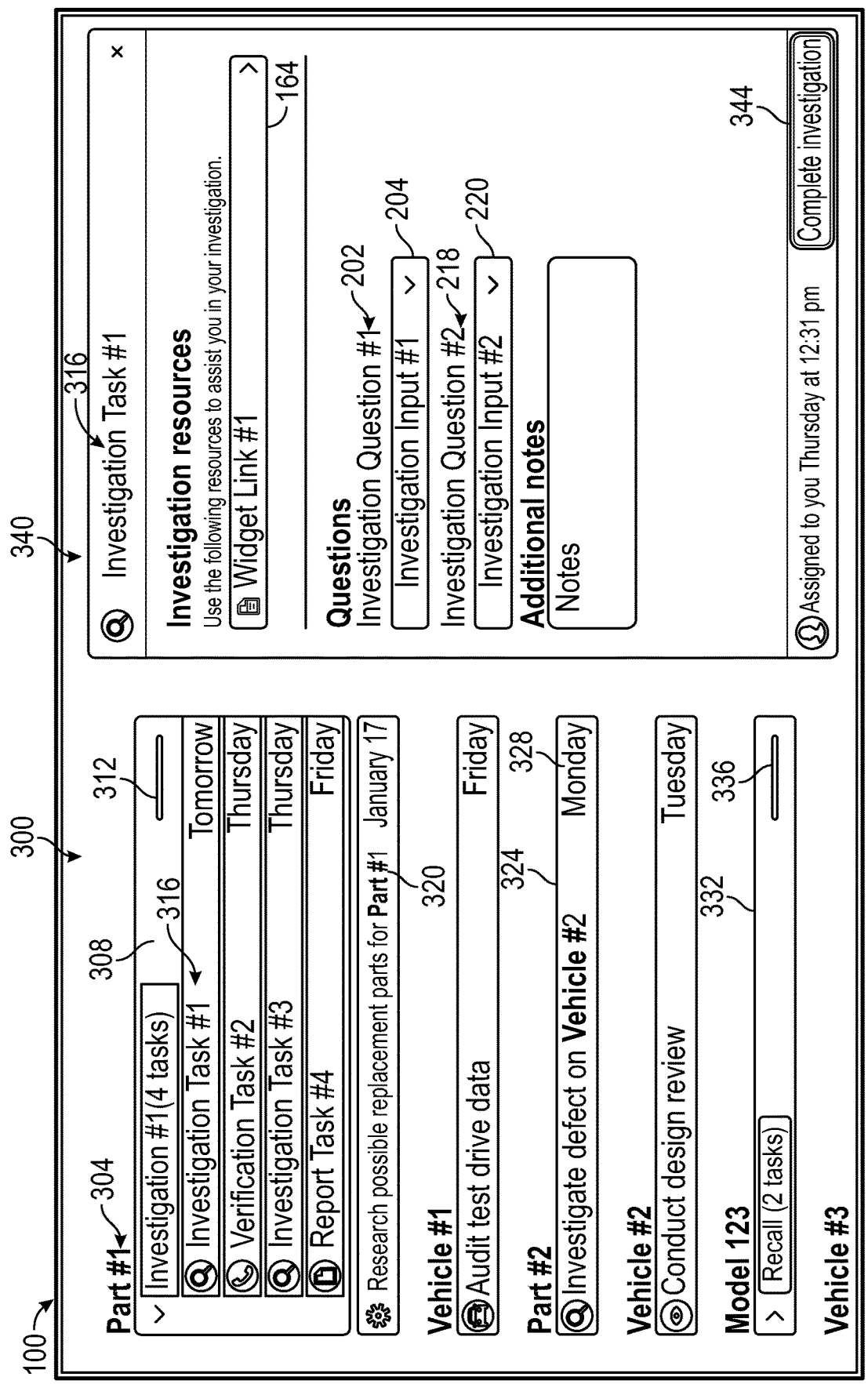
FIG. 4 shows a workflow overview interface and a task detail interface of an example interactive graphical display interface, according to an embodiment of the present disclosure.
Figure 5:
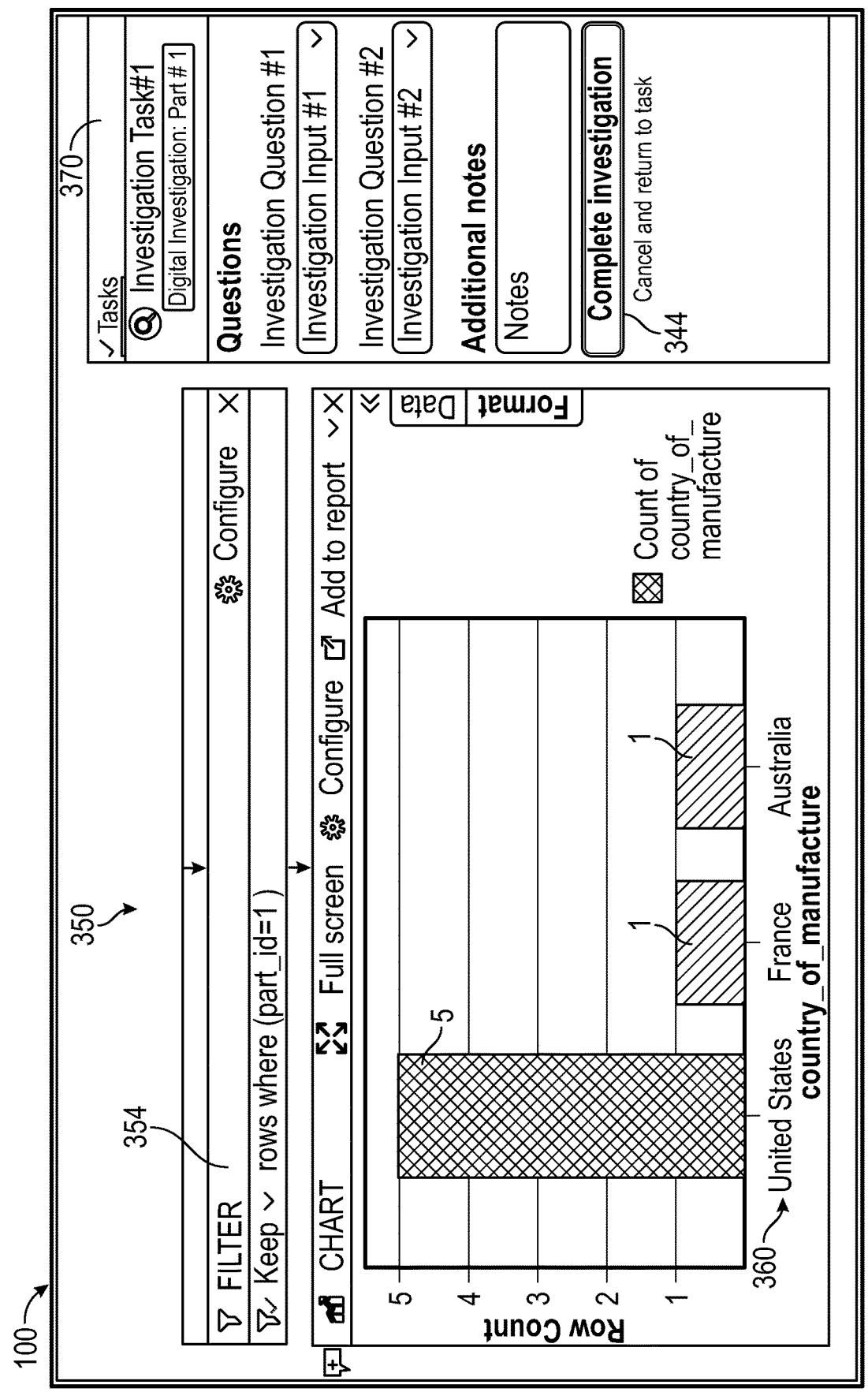
FIG. 5 shows an example interactive graphical display interface after a selection of the resource link has been made, according to an embodiment of the present disclosure.

Advantageously, the resource link 164 can be dynamic. The resource material that is displayed upon selection of the resource link 164 may be based on one or more trigger events. For example, resource material related to a first trigger event may be displayed in response to the first trigger event being met while different resource material related to a second trigger event may be displayed in response to the second trigger event being met. The resource link 164 may include a dynamic pointer that updates the information to which the resource link 164 points based on the trigger. A user (e.g., a workflow creator) can assign one or more dynamic trigger events that are associated with the resource link 164 and/or that determine the resource material that is displayed upon selection of the resource link 164. In some cases, the one or more triggers associated with the resource link 164 may include the trigger associated with the workflow trigger indicator 124 (e.g., in FIG. 1). Once the instance of the task and the associated resource link 164 are triggered for view by a user (e.g., see FIGS. 4-8), selection of the resource link 164 can generate a view of the information relevant for fulfilling the one or more data items associated with the task and/or with the resource link 164. For example, as shown in FIG. 5 below, once the dynamic resource link 164 has been selected, a viewer can open to show the information relevant to the completion of the task. The task creation interface 146 can include a task assignment selector 172. The task assignment selector 172 can allow a user to move onto any next step(s).

FIG. 3A shows another aspect of the interactive graphical display interface 100. The interactive graphical display interface 100 may include a task items interface 200 to allow a user to manage one or more task items of a workflow. The task items interface 200 can include one or more task item indicators 202, 218. The one or more task item indicators 202, 218 can be used by a user to indicate a response that a different user (e.g. a worker) should be supplying to the task item indicators. In some embodiments, the task items interface 200 includes one or more task item selectors 204, 220 to allow a user to select a response to the one or more task item indicators 202, 218, if necessary. In some cases, no response may be necessary. A corresponding task item type selector 208, 224 can allow a user to select the type of response to be received by the different user. The one or more task item type selectors 208, 224 can be specific to the type of task item (e.g., "which station?", "what location?", "where in the report?", etc.) and/or may be more generic (e.g., "how many?", "what kind?", etc.). Each task item may have a corresponding task item input type selector 212 and/or requirement status selector 216. The task item input type selector 212 can allow a user to specify an input type, such as "dropdown," or "fillable form," or some other input type. The requirement status selector 216 can allow a user to toggle whether the task item is required or not. An additional task item selector 228 can allow a user to create additional task items in the task. A task assignee selector 232 can allow a user to select one or more assignees (e.g., assigned users/workers) by whom the one or more task items are to be completed/reviewed. For example, the one or more assignees may include an assignee type (e.g., an IT department, a project manager, a quality control team, a board of directors, etc.). The task assignee selector 232 can automatically and/or manually provide access credentials or security access to view the assigned task items and/or tasks. A task assignee selector 232 can be associated with a single workflow, a single task, and/or a single task item. In some embodiments, a plurality of assignees may be assignable using the task assignee selector 232.

Indeed, the interactive graphical display interface 100 can allow a workflow to be nested and/or shared among multiple assignees. For example, a task may be assigned to a first user and a first task item of the task may be assigned to a second user. The task may have additional task items to which the first user is assigned. In this example, the interactive graphical display interface 100 can be configured to prevent the first user from completing the task until the first task item is completed by the second user and/or by someone else with access credentials. In some embodiments, the first user may not be aware of the requirements of (and/or even the existence of) the first task item and/or the assignee(s) of the first task item. The example above may similarly be applied to workflows and tasks. For example, the terms "task" and "task item" in the example above could be changed to "workflow" and "task," respectively, to describe a differently example.

The workflow may be shared among multiple assignees. For example, some tasks and/or task items may be assigned to a first user while other tasks and/or task items may be assigned to a second user. In this configuration, collaboration and/or seamless cooperation may be encouraged and/or required to complete the workflow and/or tasks. A first user may provide inputs (e.g., details of a stolen car report, patient management details, billing information) of a workflow. Such information may be viewable by a second user (e.g., a workflow manager). Additionally or alternatively, the first and/or second user may only have access to user-specific details associated with that workflow and that user's credentials. For example, a user handling billing information for a hospital may only have access to details related to billing and not patient-specific health data. Thus, some users may be restricted from certain data (e.g., sensitive data). Assigned users for one or more steps of a workflow may be grouped by type (e.g., billing, technical, medical, customer-facing, etc.), and that user type may be modified by the system and/or manually by a workflow manager.

The task items interface 200 can include a due date selector 236 that can allow a user to specify whether a due date applies to the task and/or the type of due date. For example, a time due may be specified (e.g., day of the week, day of a month, time of a year, time of day, within a certain time period, etc.), a time frame within which work can be done can be specified (e.g., after one week after task is assigned, within two months from publish of the workflow, etc.), and/or a condition or trigger may be specified (e.g., before launch of the product, while assistant is on duty, before manufacture is complete, etc.). A user may be able to indicate a completion of the task creation using a workflow completion selector 240. Additionally or alternatively, an additional task selector 244 can allow a user to specify additional tasks before completing, publishing, and/or saving the workflow. Once the user has completed the associated task, the system may automatically send the workflow (e.g., the next step of the workflow) or a relevant link to the workflow to the next user or, if there are multiple next steps, to one or more of the next users. Additionally or alternatively, the next user(s) may be assigned manually (e.g., by a workflow manager). In some embodiments, multiple users may work on various steps of the workflow and/or a common step of the workflow simultaneously (e.g., at the same time, while that common step is pending completion).

Figure 3B:
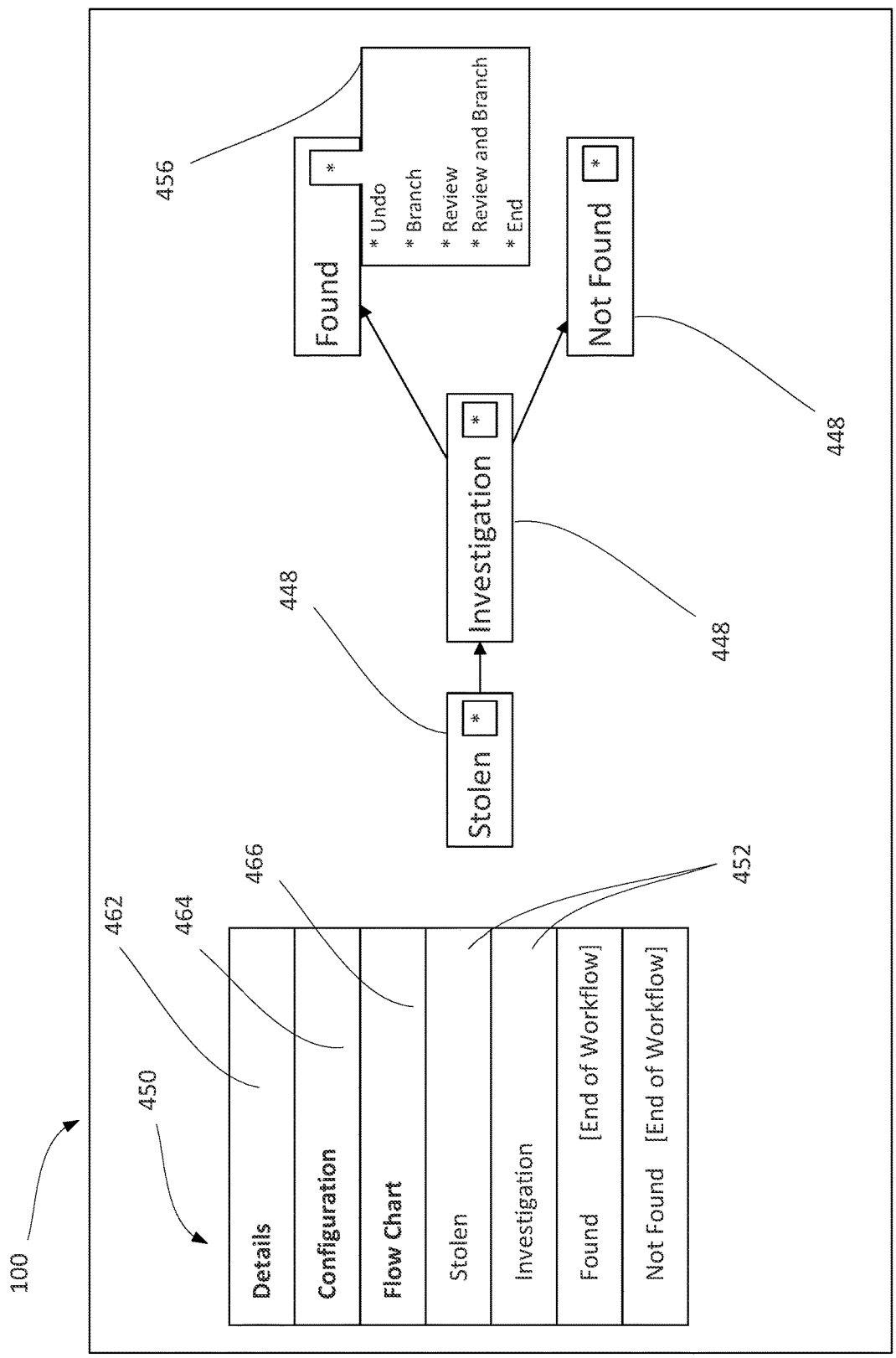
FIG. 3B shows another example interactive graphical display interface showing a workflow flowchart interface that provides functionality for creating a workflow and for workflow management.

FIG. 3B shows another example interactive graphical display interface 100 showing a workflow flowchart interface that provides functionality for creating a workflow and for workflow management. The interface can include a task modification menu 450. The task modification menu 450 can include a Details selector 462, a Configuration selector 464, a Flow Chart selector 466, and/or other selectors. As shown, the Flow Chart selector 466 may include flow chart elements 452 and a creation interface (e.g., flowchart interface). The flowchart interface can include one or more task selectors 448 that can correspond to one or more flow chart elements 452. The task selector 448 may share one or more features of one or more of the task item selectors 204, 220, 228, 390, 394, 398 described herein. The task modification menu 450 can allow a user to modify one or more steps and/or requirements of the workflow and/or individual tasks. As shown, the task modification menu 450 can allow a user to modify aspects of the workflow (e.g., "stolen," "investigation," "found," "not found", etc.). Other variations are possible.

The Details selector 462 can allow a user to view various details of a workflow (e.g., the workflow shown by the flowchart in FIG. 3B). Such details may be available as shown, for example in one or more of FIGS. 1-3A or 4-8. The Configuration selector 464 may include a coding template usable by a technical user to modify one or more aspects (e.g., steps or aspects of steps) of a workflow by directly inputting computer code. The Configuration selector 464 may show a coding platform where a user can input technical commands, logic, or other instructions to update the corresponding aspects of the workflow.

The systems described herein may also provide non-technical users an intuitive interface for creating, modifying, and/or deleting one or more workflows. For example, in response to a selection of the Flow Chart selector 466, the system may allow a user to quickly and easily manipulate elements of a flowchart in the interactive graphical display interface 100 shown in FIG. 3B. For example, in some embodiments, a user can add and/or subtract one or more task selectors 448 in a flowchart format. Each task selector 448 can represent a part (e.g., step) of the workflow. By selection of one or more of the flow chart elements 452 (and/or the task selectors 448 in certain embodiments), the system can display details associated with the selected task element or aspect of the workflow.

The interface can allow for real-time servicing of data that is relevant to a workflow and/or a user of the workflow. In particular, the workflow may select data from a database (e.g., via a network) relevant to the workflow and/or step of the workflow. For example, the system may select object data such as a police report or related information for allowing a user to input that information into the workflow. As shown, the task selector menu 456 can include one or more commands a user may select for a corresponding step or task selector 448 (e.g., undo, branch, rename, review and branch, end). A task selector 448 may have one or more task selectors that can branch from the task selector 448. Thus, two, three, or more task selectors may branch from a single task selector 448. Each task selector 448 may relate to a step in a workflow, a variable of a step, an assigned user, or any other aspect of the workflow.

Each workflow and/or step of a workflow may be assigned to a particular user. Thus, a workflow may be configured for completion by a plurality of users. Each task may provide only relevant and/or necessary data to the corresponding user(s) for that task so that a user is not overloaded with unnecessary or irrelevant data, so that certain data is viewable only by appropriate user(s), and/or so that the workflow steps may be finished in a more efficient and streamlined manner.

When a non-linear path may be needed in the workflow, a decision widget may be included in a workflow step or task. For example, if one or more of the task selectors 448 indicates a branch where more than one option is available, the decision widget may allow the assigned user to determine which decision should be made (e.g., which next step should be taken in the workflow). As shown in FIG. 3B, for example, the investigation task selector 448 allows for two options, "Found" and "Not Found." Within the task or step associated with the investigation task selector 448 (not shown), a decision widget can allow the assigned user to determine whether the next step in the workflow should be "Found" or "not Found." Additionally or alternatively, in some embodiments the workflow may require a step backward to repeat an already-completed task to be completed again anew and/or amended. A corresponding decision widget in the respective step or task may be included in the interface. A decision widget may allow a user and/or the system to specify or identify who made a decision about the step, when that decision was made, where the decision was made, why the decision was made, about what the decision was made, and/or what effect that decision had on other aspects of the workflow. Such data may be reviewable by another user (e.g., a workflow manager).

The systems described herein can allow a user to perform tasks within an inbox of a client system (e.g., email, social media, etc.). This can allow for more rapid response by a user and/or a smoother task transition for a user. Once the step and/or workflow is created, an alert can be manually and/or automatically sent to a connected database to notify another user (e.g., an assigned user of the next step) that the previous step has been completed and/or the workflow has been created. Once that step has been created, the next user(s) in the workflow may be notified in their respective inbox(es).

FIGS. 1-3B generally describe a user interface for creating a workflow or workflow template. The created workflow or template will then be displayed for a different user or users when the trigger event(s) have been fulfilled. FIG. 4 shows a workflow overview interface 300 and a task detail interface 340 of an interactive graphical display interface 100. The interface shown in FIG. 4 is an example view that a user may see once the one or more trigger events have been fulfilled and the instance of the workflow (e.g., one created using the interface of FIGS. 1-3) has been created. The interactive graphical display interface 100 shown in FIG. 4 may be a view that a user (e.g., a worker) sees when completing a workflow, for example after the workflow has been created (see, e.g., FIGS. 1-3). In some embodiments, the workflow overview interface 300 and the task detail interface 340 may be in adjacent display portions of the interactive graphical display interface 100. Other variants are possible, such as having both be viewable sequentially and/or on different display screens. The workflow overview interface 300 can include one or more element indicators 304. An element may refer to a project item or category in which one or more workflows may be categorized. For example, an element could be almost any type of grouping, including a part number, a subsection of a product, a product, an entity, a group of people, a goal, a geographic area, or any other categorization to which workflows may be assigned. One or more workflows may be grouped as shown. For example, the workflow indicators 308, 320 show that the two associated workflows correspond to the element associated with the element indicator 304.

As shown, the element indicator 304 can include one or more workflow indicators 308, 320, 324, 332. Each workflow indicator 308, 320, 324, 332 can represent corresponding workflows. A workflow can include a single task or a plurality of tasks. Similarly a task can include a single task item or a plurality of task items. Each workflow indicator 308, 320, 324, 332 can be associated with corresponding one or more task indicators 316, when applicable. Each task indicator 316 may be associated with a corresponding task. The task indicator 316 may correspond to an entry received in the task creation interface 146 described herein. Additionally or alternatively, the workflow indicator 308 may correspond to an input received in the workflow creation interface 104 (e.g., in the workflow name selector 108).

Each workflow indicator 308 may include a corresponding workflow progress indicator 312, 336. The workflow progress indicator 312, 336 may be a bar (as shown), a heat map, a numerical indicator, or any other status and/or progress indicator. Each task and/or workflow may be associated with a specific task and/or with a specific workflow. The workflow progress indicator 312, 336 may be modified as additional tasks and/or task items are completed. In some embodiments, the workflow progress indicator 312, 336 does not change until a task and/or task item is completed in full (e.g., partial completion does not apply). One or more tasks and/or workflows may be associated with a workflow deadline indicator 328. The workflow deadline indicator 328 may correspond to an input received from the due date selector 236 of FIG. 3A. Accordingly, the displayed workflow deadline indicator 328 may show a time, a day, a day of the week, an event condition, and/or any other of the times/conditions described above with respect to the due date selector 236.

The task detail interface 340 can allow a user, in certain embodiments, simultaneously view a summary or overview of the assigned workflows and/or tasks (e.g., as shown in the workflow overview interface 300) while viewing the items of a corresponding task. As shown, the task indicator 316 of the task detail interface 340 may correspond to the task indicator 316 of the workflow overview interface 300. For example, the task indicator 316 may be highlighted or otherwise emphasized in the workflow overview interface 300, as shown. The task detail interface 340 can further include the resource link 164 discussed herein. The resource link 164 of the task detail interface 340 may be received, for example, in the task creation interface 146 of FIG. 2. Additional and/or different links may be included. Corresponding task item indicator 202, task item selector 204, task item indicator 218, and/or task item selector 220, which had been provided and received in the task items interface 200 of FIG. 3A, may be displayed as well. The user (e.g., the assigned worker) may work through the task detail interface 340 to complete the task. Once the task has been completed, a user can select the task completion selector 344. Upon selection of the task completion selector 344, the user may be taken to a new display screen, such as a new task. In some embodiments, the selection of the task completion selector 344 saves the work and/or displays a version (e.g., grayed-out version) of the task detail interface 340 to allow a user to review the selections. If a selection needs to be edited or revised, a user may be able to select an edit selector (not shown) to update one or more of the inputs to the one or more task item indicators 202, 218. In some embodiments, the task summary interface 370 may prevent a user from selecting the task completion selector 344 unless the resource link 164 has been selected and/or viewed. Other conditions for selecting the resource link 164 may be included in the interactive graphical display interface 100 before a user can select the task completion selector 344. To indicate that the task completion selector 344 may not be selected, the task completion selector 344 may be grayed or lighted, for example, until the one or more conditions (e.g., viewing the resource link 164) has been met.

A user may select the resource link 164. Upon selection of the resource link 164, a user may be shown a resource interface 350. The resource interface 350 can be associated with the resource link 164. For example, if the resource link 164 is a website link, the resource interface 350 may display the website within the interactive graphical display interface 100. Advantageously, the resource interface 350 may be displayed simultaneously (e.g., adjacent, as shown) as a task interface, such as the task detail interface 340 or a task summary view 370. A user may be able to provide input selections within the task summary interface 370 while the resource interface 350 is open. Accordingly, the resource interface 350 can allow a user to quickly find the information needed to answer the questions or other complete the requirements of the task as shown in the task summary interface 370.

FIG. 5 shows an example interactive graphical display interface 100 after a selection of the resource link 164 has been made. The resource interface 350 may be displayed in the same or similar display region as was showing the workflow overview interface 300. Other variants are possible, however. The resource interface 350 can include information from an internal link or from any other link as described herein. As shown, the resource interface 350 may include graphics or other data in the form of a resource element indicator 360. The resource element indicator 360 may allow a user to manipulate data (e.g., in a spreadsheet or database). The resource element indicator 360 can provide information to aid a user in satisfying the appropriate responses from the task as shown in the task detail interface 340 or task summary interface 370. Various manipulation features such as a resource action selector 354 may be available to aid a user in viewing and/or using the data shown in the resource element indicator 360 or aspect of the resource interface 350. The resource action selector 354 may include a filter menu, an action menu, one or more selectable commands, etc. Once the user has completed the task and/or obtained the necessary information, the user may select a selector for closing the resource interface 350. For example a "cancel" selector or similar selector may be displayed, such as the one shown in FIG. 5. Additionally or alternatively, a task completion selector 344 can be included in the task summary interface 370 to allow a user to move on to a next task or to complete the workflow.

Figure 6:
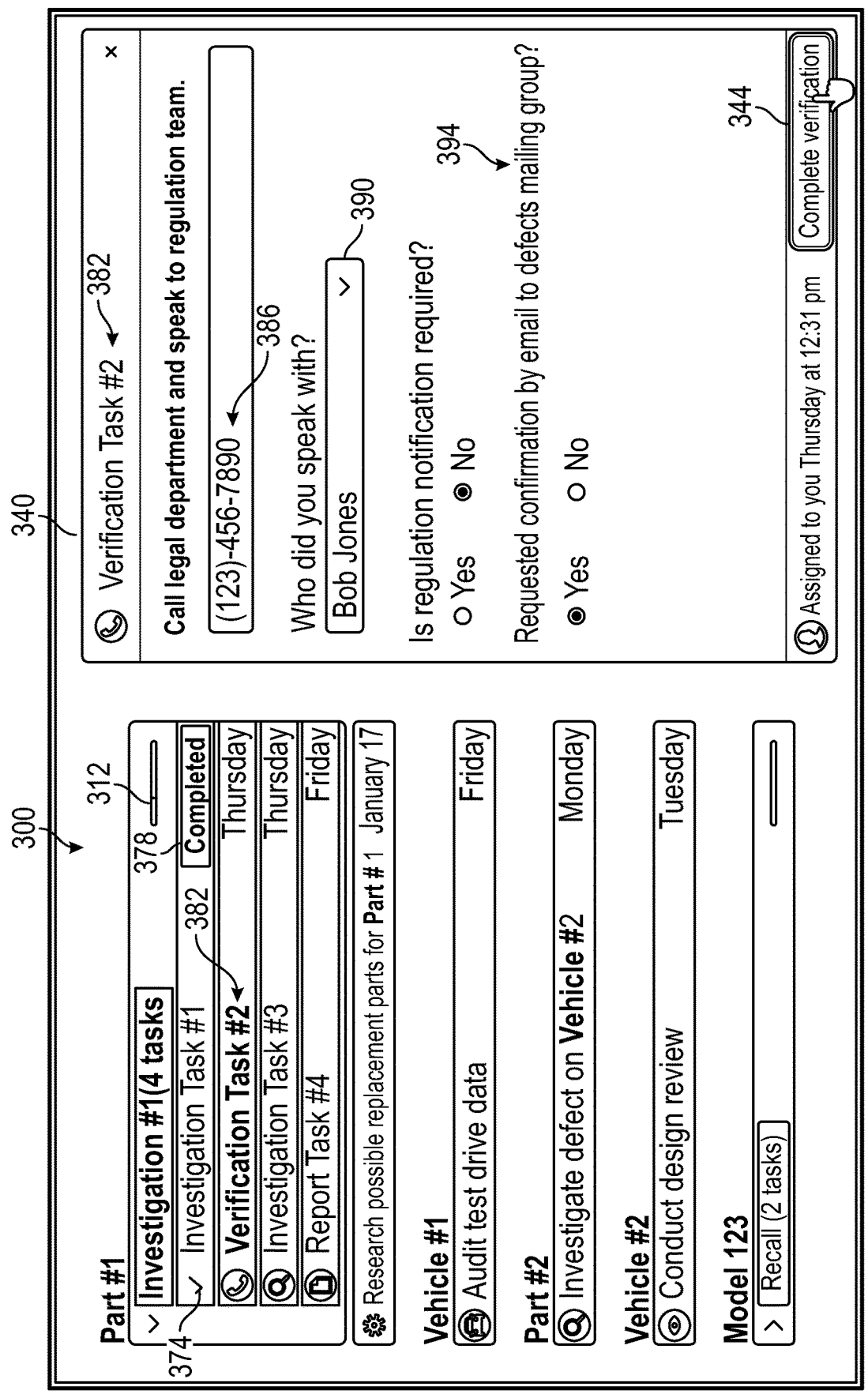
FIG. 6 shows another view of the interactive graphical display interface of FIG. 4, according to an embodiment of the present disclosure.

FIG. 6 shows another view of the interactive graphical display interface 100 of FIG. 4. The view shown in FIG. 6 may result, for example, after a user selects the task completion selector 344 described with respect to FIG. 5. As shown in FIG. 6, a task symbol indicator 374 may indicate that a corresponding task has been completed. Additionally or alternatively, a task status indicator 378 can show a status of an associated task. The task status indicator 378 can show, for example, that the task has been completed, as shown in FIG. 6. However, other indicators may be included. For example, the task status indicator 378 may indicate that the task has been started but not completed, that the task has been opened, that the task is being reviewed, and/or any other task status. As shown, the workflow progress indicator 312 has been updated to indicate that the associated workflow is partially completed. When the workflow is completed, a corresponding indication may be shown with the workflow progress indicator 312. For example, a completed bar may be shown, a ribbon of completion may be displayed, or any other completion indicator. The workflow overview interface 300 may indicate that a next task indicator 382 in the workflow is currently being displayed. The indication may be a highlighting of the task indicator 382 or some other indication.

The task detail interface 340, as shown, can display a different task indicator 382. The task indicator 382 can correspond to the task indicator 382 of the workflow overview interface 300. A different resource link 386 can be displayed. As shown, the link can be a telephone number that, when selected, for example, automatically dials and/or connects the user to a recipient. A different task item selector 390 that is associated with the task associated with the task indicator 382 may be shown. One or more additional task item selectors 394 may be shown as well. At the completion of the task, a user may select the task completion selector 344 to indicate completion of the task.

Figure 7:
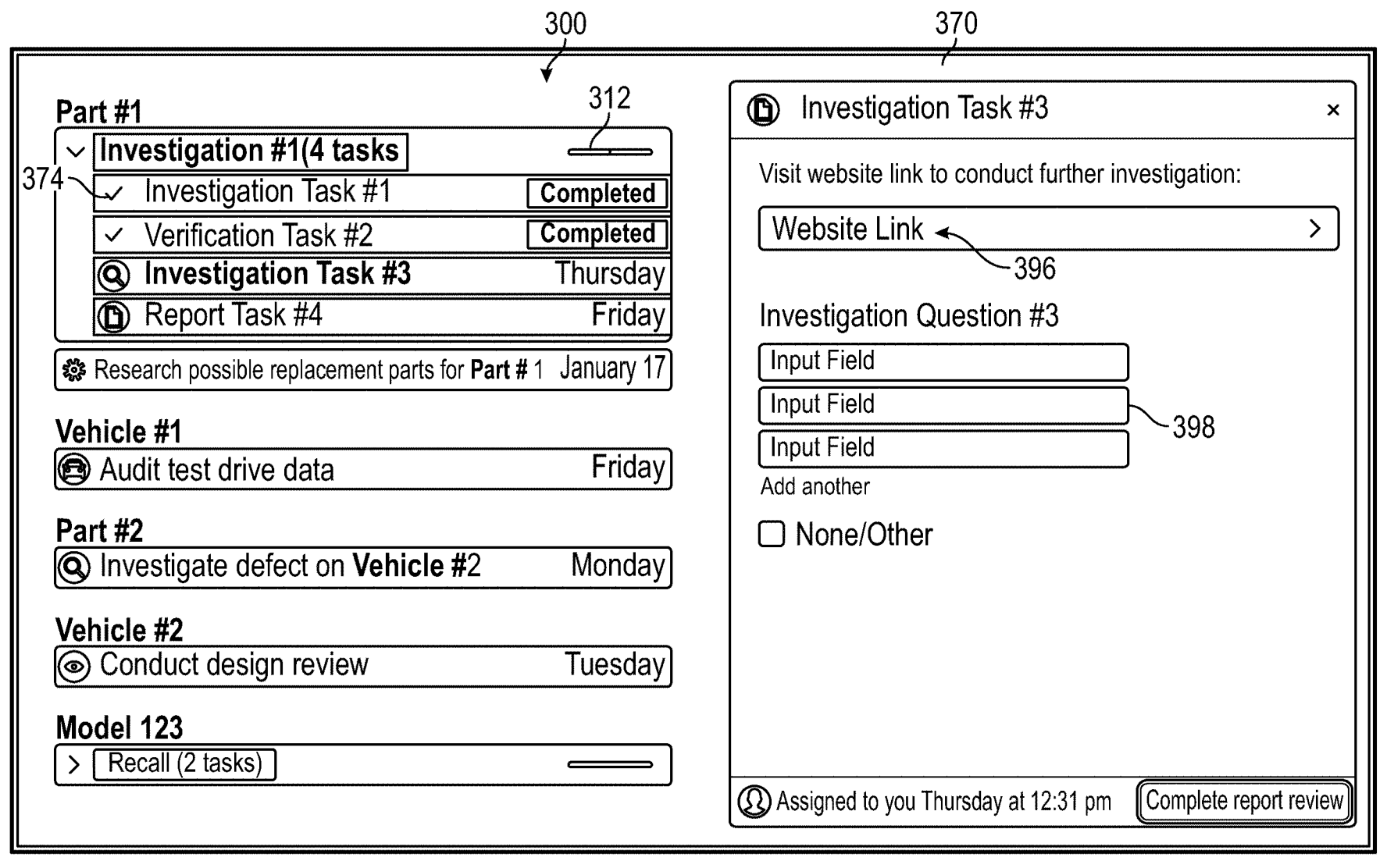

FIG. 7 shows yet another view of the interactive graphical display interface 100. The workflow overview interface 300 shows various elements of the display that have been updated once the user has indicated completion of the task shown in the task summary interface 370 of FIG. 6. For example, an additional task symbol indicator 374 may be shown and/or an updated workflow progress indicator 312. The task summary interface 370 can show a third task. A third resource link 396 and/or one or more task item selectors 398 may be included in the task summary interface 370.

Figure 8:
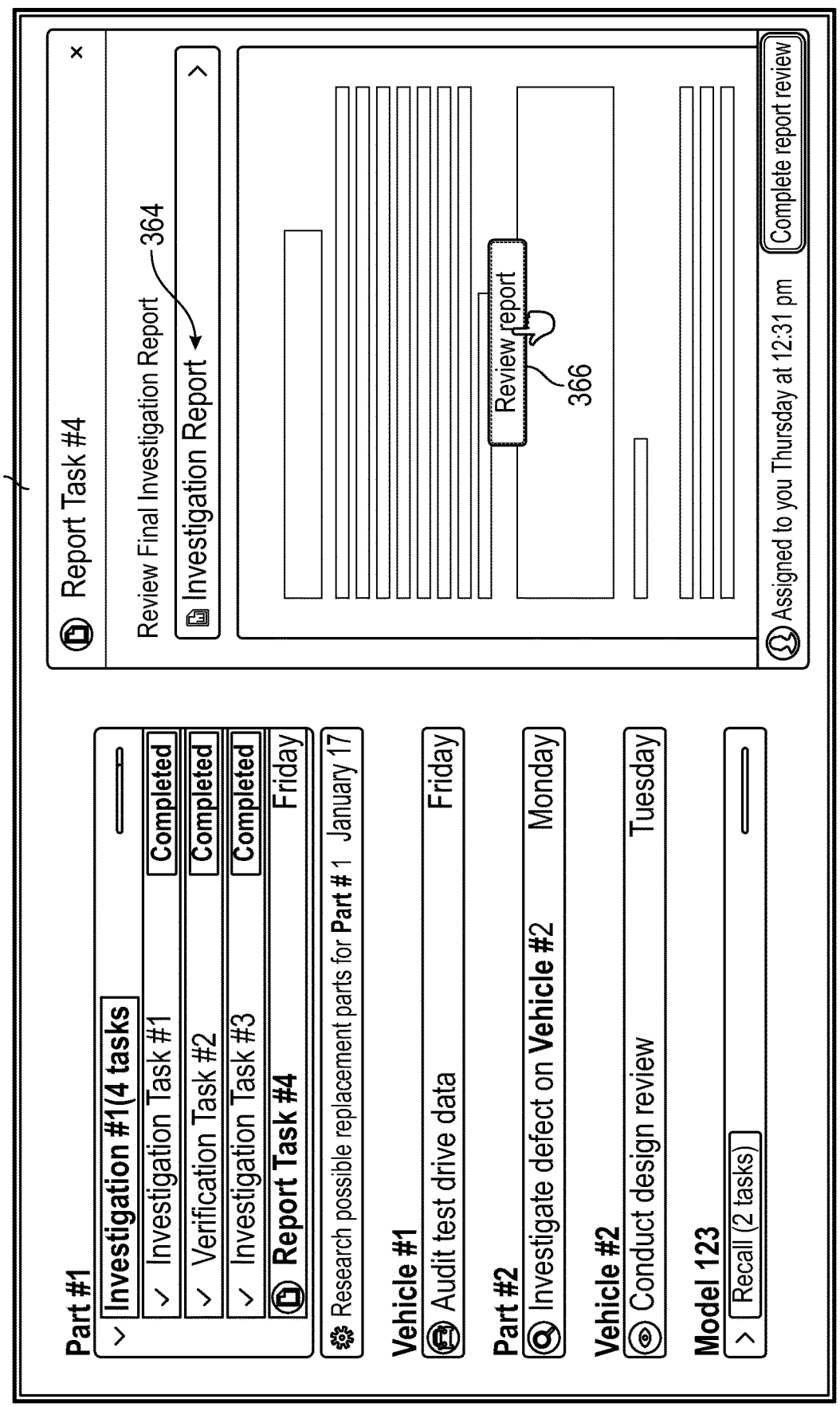
FIG. 8 shows a task detail interface that includes a report task, according to an embodiment of the present disclosure.

FIG. 8 shows a task detail interface 340 that includes a report task. The task may include a resource link 364 that directs a user, for example, to a report (e.g., internal document, external document, fillable form, etc.) when selected. A resource viewer 366 may be displayed once the resource link 364 has been selected. The resource viewer 366 may appear in the task detail interface 340 and/or in the workflow overview interface 300, as appropriate, according to some embodiments.

Figure 9:
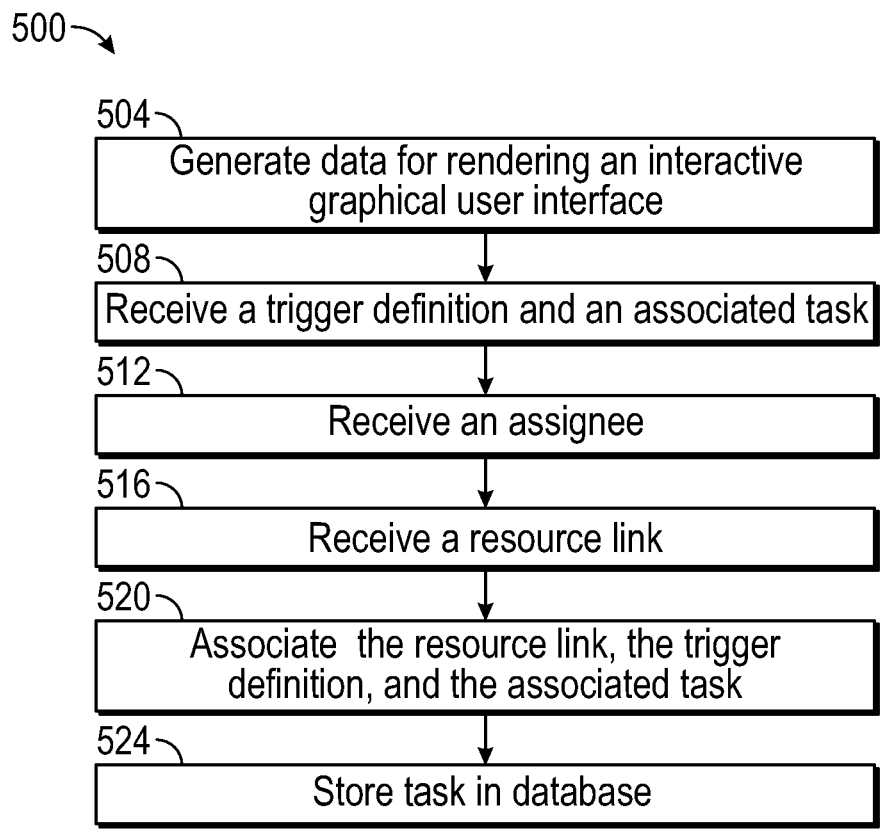
FIG. 9 shows a method of storing a user-created task, according to an embodiment of the present disclosure.
Figure 10:
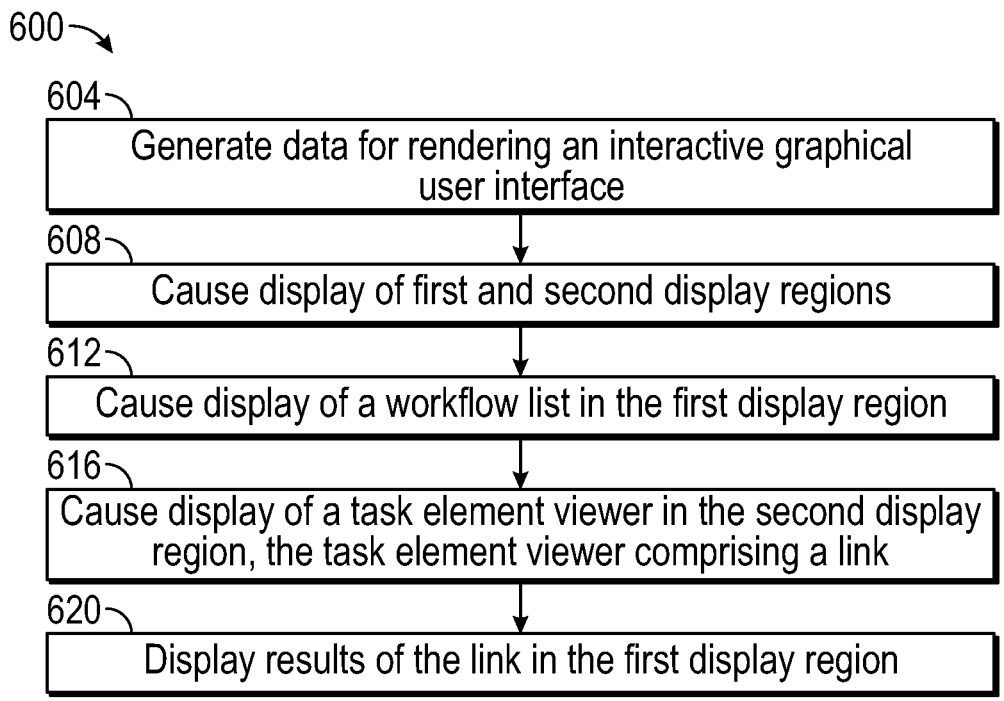
FIG. 10 shows a method of displaying information associated with a resource link in a first display region of an interactive interface, according to an embodiment of the present disclosure.

FIGS. 9-10 identify two example computer-implemented methods. FIG. 9 shows a method 500 of storing a user-created task. The method 500 can include a block 504 where a computer system generates data for an interactive graphical user interface. Via the graphical user interface, at block 508 the system can receive (e.g., from a user) a trigger definition and/or an associated task. The task can include one or more features, such as an assignee, a resource link, etc. as described herein. At block 512, the system can receive one or more assignees. The method may automatically update access credentials to be given to the one or more assignees and/or may allow for manual update of the credentials (e.g., from a user input). The method may employ any artificial intelligence and/or machine learning techniques to perform any of these steps. In some embodiments, at block 516 the system can receive a resource link. At block 520, the system can associate the resource link, the trigger definition, and/or the associated task together. The task and associated elements may be stored in a database at block 524. The stored task and associated elements can include additional information as described herein. Additional details and features of the method 500 are described with reference, for example, to FIGS. 1-3.

FIG. 10 shows a method 600 of displaying information associated with a resource link in a first display region of an interactive interface. At block 604 the method can include generating data for an interactive graphical user interface. At block 608 the method includes displaying first and second display regions on the interface. The method may further include at block 612 causing display of a workflow list and/or a workflow overview in a first display region. At block 616, the method may cause display of a task element viewer in a second display region. In some embodiments, the task element viewer may include display of a link, such as a resource link described herein. The second region may be displayed adjacent the first region, but other variants are possible. Other features of the display may be as described herein. In some embodiments, the method may include receiving a selection of the link. At block 620, the method displays results of the link in the first display region. The results of the link may include resource material associated with the link (e.g., content of a website, or any other resource material described herein). Additional details and features of the method 600 are described with reference, for example, to FIGS. 4-7.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
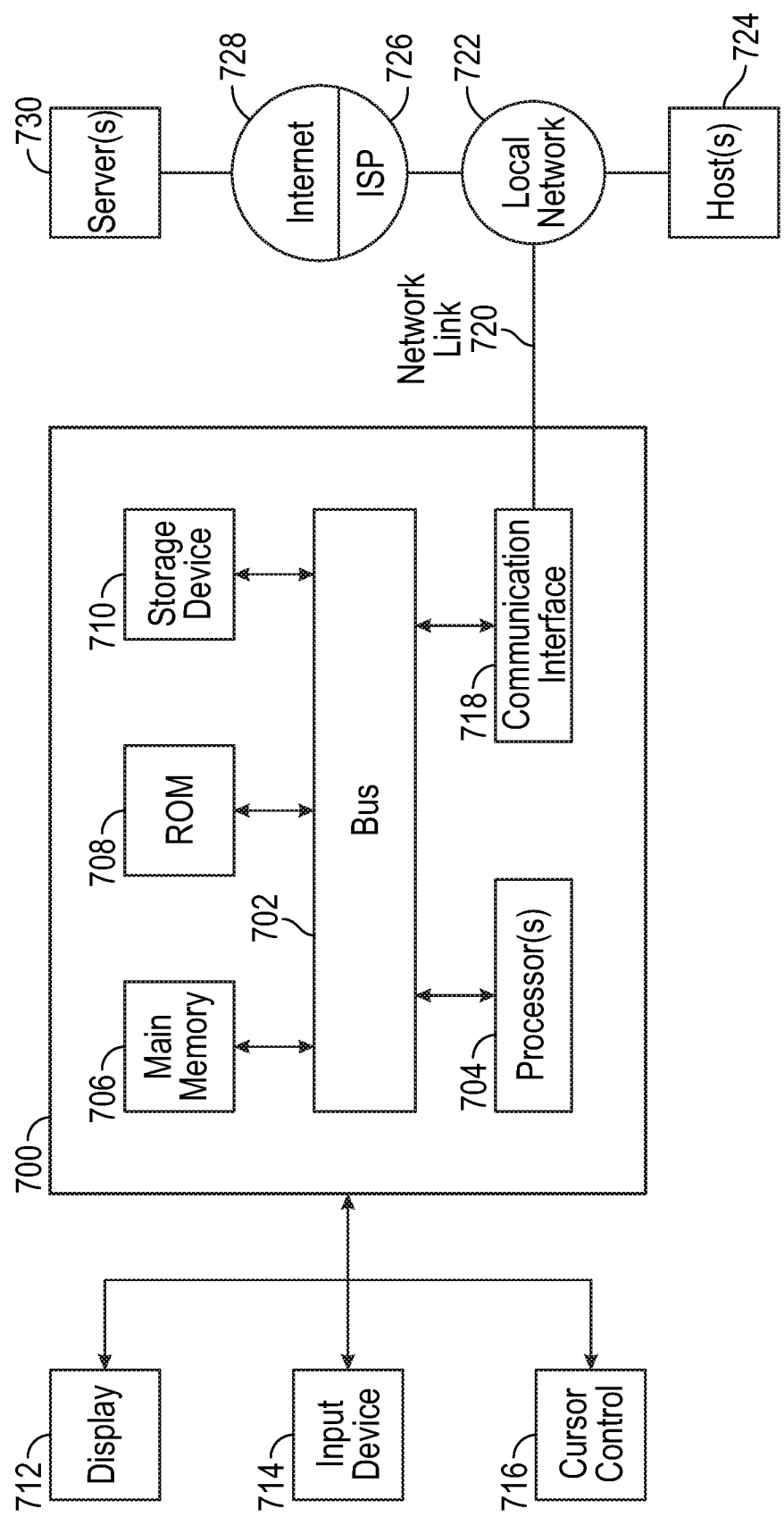
FIG. 11 shows a block diagram that illustrates a computer system upon which various embodiments may be implemented.

For example, FIG. 11 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
a computer readable storage medium having program instructions embodied therewith; and
one or more processors configured to execute the program instructions to cause the computing system to:
generate data for rendering an interactive graphical user interface, the interactive graphical user interface comprising a list of tasks, wherein at least a task of the tasks is associated with:
at least a first trigger event and a second trigger event, wherein the first and second trigger events are user defined, and
a dynamic pointer to a resource;
in response to at least the first trigger event:
update the dynamic pointer to point to first resource material, and
update the data to display a resource link configured, based on the dynamic pointer and the first trigger event, to point to the first resource material associated with the task comprising one or more task items, the first trigger event comprising an event associated with the task;
in response to a user selection of the resource link, update the data to display the first resource material associated with the task in the interactive graphical user interface; and
receive user input configured to indicate that the task is complete.

2. The computing system of claim 1, wherein the one or more processors are configured to execute the program instructions to cause the computing system to:
in response to at least the second trigger event, update the data to display a second resource link configured, based on the dynamic pointer and the second trigger event, to point to second resource material associated with the task, the second trigger event comprising an event associated with the task.

3. The computing system of claim 2, wherein the one or more processors are configured to execute the program instructions to cause the computing system to:
in response to a user selection of the second resource link, update the data to display the second resource material associated with the task in the interactive graphical user interface.

4. The computing system of claim 1, wherein one or more task elements are configured to allow a user to indicate completion of the corresponding one or more task items of the task.

5. The computing system of claim 1, wherein the task comprises a workflow, the workflow comprising a plurality of tasks.

6. The computing system of claim 5, wherein the one or more processors are configured to execute the program instructions to cause the computing system to:
update the data to display an indication of the workflow comprising the plurality of tasks without displaying an indication of the plurality of tasks.

7. The computing system of claim 1, wherein the list of tasks comprises a workflow comprising a plurality of tasks associated with the workflow.

8. The computing system of claim 1, wherein the list of tasks comprises a workflow comprising a plurality of tasks, and wherein the one or more processors are configured to execute the program instructions to cause the computing system to:
update the data to display, in response to a selection of the resource link, a report comprising data received during completion of the plurality of tasks.

9. The computing system of claim 1, wherein the list of tasks comprises a first task associated with a user and a second task not associated with the user, wherein the one or more processors are configured to execute the program instructions to cause the computing system to:
receive an indication of a user identity; and
generate data to display the first task and not the second task in response to receiving the indication of the user identity.

10. The computing system of claim 9, wherein indication of a user identity comprises an access permission.

11. The computing system of claim 9, wherein the one or more processors are configured to execute the program instructions to cause the computing system to:
generate data for rendering a second interactive graphical user interface, the second interactive graphical user interface comprising the second task.

12. The computing system of claim 1, wherein the generated data for rendering an interactive graphical user interface are configured to display the list of tasks in a first display region.

13. A computer-implemented method comprising:
generating data for rendering an interactive graphical user interface, the interactive graphical user interface comprising a list of tasks, wherein at least a task of the tasks is associated with:
at least a first trigger event and a second trigger event, wherein the first and second trigger events are user defined, and
a dynamic pointer to a resource;
in response to at least the first trigger event:
updating the dynamic pointer to point to first resource material, and
updating the data to display a resource link configured, based on the dynamic pointer and the first trigger event, to point to the first resource material associated with the task comprising one or more task items, the first trigger event comprising an event associated with the task;

in response to a user selection of the resource link, updating the data to display the first resource material associated with the task in the interactive graphical user interface; and receiving user input configured to indicate that the task is complete.

14. The computer-implemented method of claim 13 further comprising:

in response to at least the second trigger event, update the data to display a second resource link configured, based on the dynamic pointer and the second trigger event, to point to second resource material associated with the task, the second trigger event comprising an event associated with the task.

15. The computer-implemented method of claim 14 further comprising:

in response to a user selection of the second resource link, update the data to display the second resource material associated with the task in the interactive graphical user interface.

16. The computer-implemented method of claim 13, wherein the list of tasks comprises a first task associated with a user and a second task not associated with the user, and the computer-implemented method further comprising:

receive an indication of a user identity; and generate data to display the first task and not the second task in response to receiving the indication of the user identity.

17. The computer-implemented method of claim 16 further comprising generating data for rendering a second interactive graphical user interface, the second interactive graphical user interface comprising the second task.

18. The computer-implemented method of claim 16, wherein indication of a user identity comprises an access permission.

19. The computer-implemented method of claim 13, wherein the list of tasks comprises a workflow comprising a plurality of tasks, and the computer-implemented method further comprising:

updating the data to display, in response to a selection of the resource link, a report comprising data received during completion of the plurality of tasks.

20. A non-transitory machine-readable storage medium encoded with instructions executable by a processor of a computing device, wherein the instructions, when executed by the processor, cause the computing device to at least:

generate data for rendering an interactive graphical user interface, the interactive graphical user interface comprising a list of tasks, wherein at least a task of the tasks is associated with:

at least a first trigger event and a second trigger event, wherein the first and second trigger events are user defined, and a dynamic pointer to a resource;

in response to at least the first trigger event:

update the dynamic pointer to point to first resource material, and update the data to display a resource link configured, based on the dynamic pointer and the first trigger event, to point to the first resource material associated with the task comprising one or more task items, the first trigger event comprising an event associated with the task;

in response to a user selection of the resource link, update the data to display the first resource material associated with the task in the interactive graphical user interface; and receive user input configured to indicate that the task is complete.

* * * * *